US008606791B2

(12) United States Patent
Ostrovsky (10) Patent No.: US 8,606,791 B2
(45) Date of Patent: Dec. 10, 2013

(54) CONCURRENTLY ACCESSED HASH TABLE

(75) Inventor: Igor Ostrovsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 13/163,260

(22) Filed: Jun. 17, 2011

(65) Prior Publication Data
US 2012/0323972 A1 Dec. 20, 2012

(51) Int. Cl.
*G06F 17/30* (2006.01)
(52) U.S. Cl.
USPC ............................ 707/747; 707/704; 711/216
(58) Field of Classification Search
USPC ........... 707/698, 747, 999.008, 999.107, 704; 711/216, 221
See application file for complete search history.

(56) References Cited

U.S. PATENT DOCUMENTS

| | | | | |
|---|---|---|---|---|
| 6,144,983 | A * | 11/2000 | Klots et al. ..................... | 718/104 |
| 7,370,054 | B1 * | 5/2008 | Martin et al. ................. | 707/747 |
| 7,469,329 | B2 | 12/2008 | Kuczynski et al. | |
| 7,809,916 | B1 * | 10/2010 | Shavit et al. .................. | 711/170 |
| 2008/0228691 | A1 | 9/2008 | Shavit et al. | |
| 2010/0257181 | A1 * | 10/2010 | Zhou et al. .................... | 707/747 |
| 2010/0274937 | A1 | 10/2010 | Song et al. | |
| 2012/0036134 | A1 * | 2/2012 | Malakhov ...................... | 707/747 |
| 2012/0054467 | A1 * | 3/2012 | Fulton et al. .................. | 711/216 |

OTHER PUBLICATIONS

Triplett, et al., "Resizable, Scalable, Concurrent Hash Tables", Retrieved at <<http://www.cs.pdx.edu/pdfs/tr1101.pdf>>, Retrieved Date: Mar. 30, 2011, pp. 1-12.
Birk, et al., "Parallelizing FPGA Placement Using Transactional Memory", Retrieved at <<http://www.eecg.toronto.edu/~steffan/papers/birk_fpt10.pdf>>, International Conference on Field-Programmable Technology, 2010, pp. 9.
"Problem", Retrieved at <<http://parlab.eecs.berkeley.edu/wiki/_media/patterns/paraplop_g2_4.pdf>>, Retrieved Date: Mar. 30, 2011, pp. 6.
Fischer, et al., "Lock Allocation", Retrieved at <<http://www.jmfischer.org/papers/popl07_locking.ps>>, Proceedings of the 34th Annual ACM Symposium on the Principles of Programming Languages, Jan. 17-19, 2007, pp. 6.
Triplett, Josh, "Scalable Concurrent Hash Tables via Relativistic Programming", Retrieved at <<Scalable Concurrent Hash Tables via Relativistic Programming>>, Retrieved Date: Mar. 30, 2011, pp. 20.

* cited by examiner

*Primary Examiner* — Leslie Wong (57) ABSTRACT

A method of resizing a concurrently accessed hash table is disclosed. The method includes acquiring the locks in the hash table. The hash table, in a first state, is dynamically reconfigured in size into a second state. Additionally, the amount of locks is dynamically adjusted based on comparing the size of the hash table in the second state to the size of the hash table in the second state.

20 Claims, 5 Drawing Sheets

CONCURRENTLY ACCESSED HASH TABLE

BACKGROUND

A hash table, or hash map, is a data structure that uses a hash function to map identifying values, known as keys, to their associated values. For example, a key may include a name and the associated value may include their e-mail address. In this manner, a hash table implements an associative array. The hash function is used to transform the key into the index, or the hash, of an array element, often referred to as a slot or bucket, where the corresponding value is to be sought. For example, a hash function can calculate an index from the key of a data item and use the index to place the data into the array. In this respect, a hash function can be expressed as index=f(key, ArrayLength)

where ArrayLength is the size of the array. In many situations, hash tables turn out to be more efficient than search trees or any other table lookup structure. For this reason, they are widely used in many kinds of computer software, particularly for associative arrays, database indexing, caches, and sets.

In theory, the hash function could map each possible key to a unique slot index, but this ideal is rarely achievable in practice unless the hash keys are fixed, i.e., new entries are not added to the table after it is created. Instead, many hash table designs assume that hash collisions—different keys that map to the same hash value—will occur and be accommodated in some way. For example, if twenty-five hundred keys are hashed into a million array elements with uniform random distribution, the birthday paradox indicates that there will be approximately a ninety-five percent chance of at least two of the keys being hashed into the same array element. Developers continue to design hash functions to improve efficiency and to avoid collisions, so hash functions can behave differently, but at times a hash function can include deficiencies that are difficult to detect.

Hash tables are often dynamically resized to efficiently use memory resources. In a well-dimensioned hash table, the average cost measured in number of instructions for each lookup is independent of the number of elements stored in the table. Many hash table designs also allow arbitrary insertions and deletions of key-value pairs, at constant average cost per operation. As the number of items in a table grows, more memory can be allocated to the table and new array elements are created. The existing items can be rehashed and mapped to new array elements. Some implementations can shrink the size of the table as items are removed in order to recover memory.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to a method of resizing a concurrently accessed hash table such as a hash table that can be concurrently accessed by more than one thread. The hash table includes a set of slot indexes, each including nodes configured to store values inserted into the hash table. The hash table includes a set of locks each configured to protecting one or more slot indexes. A thread acquires a lock and is allowed to access the protected slot index for such operations as adding a value to a node. While the lock is acquired, no other threads can access that node. Several locks are used so that the multiple threads can concurrently access different portions of the hash table. Each of the locks can include a counter that keeps record of an amount of values protected by the lock.

In one example, the method of resizing the hash table will proceed when a threshold size has been reached. A determination can be made to resize the hash table based upon comparing the amount of values protected by the acquired lock multiplied by the number of locks against the size of the hash table, e.g., the number of slot indexes. If the amounts are comparable, the hash table can be enlarged. In other words, the hash table, in a first state, is dynamically reconfigured in size into a second state. For example, additional slot indexes are created to the initial size of the hash table, i.e., the first state, to provide for a new and larger table, i.e., the second state. Often, at least some of the values are reassigned to different slot indexes. In addition to resizing the table, the amount of locks are dynamically adjusted based on comparing the size of the hash table in the second state to the size of the hash table in the second state. For example, additional locks are created to help protect the enlarged hash table.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
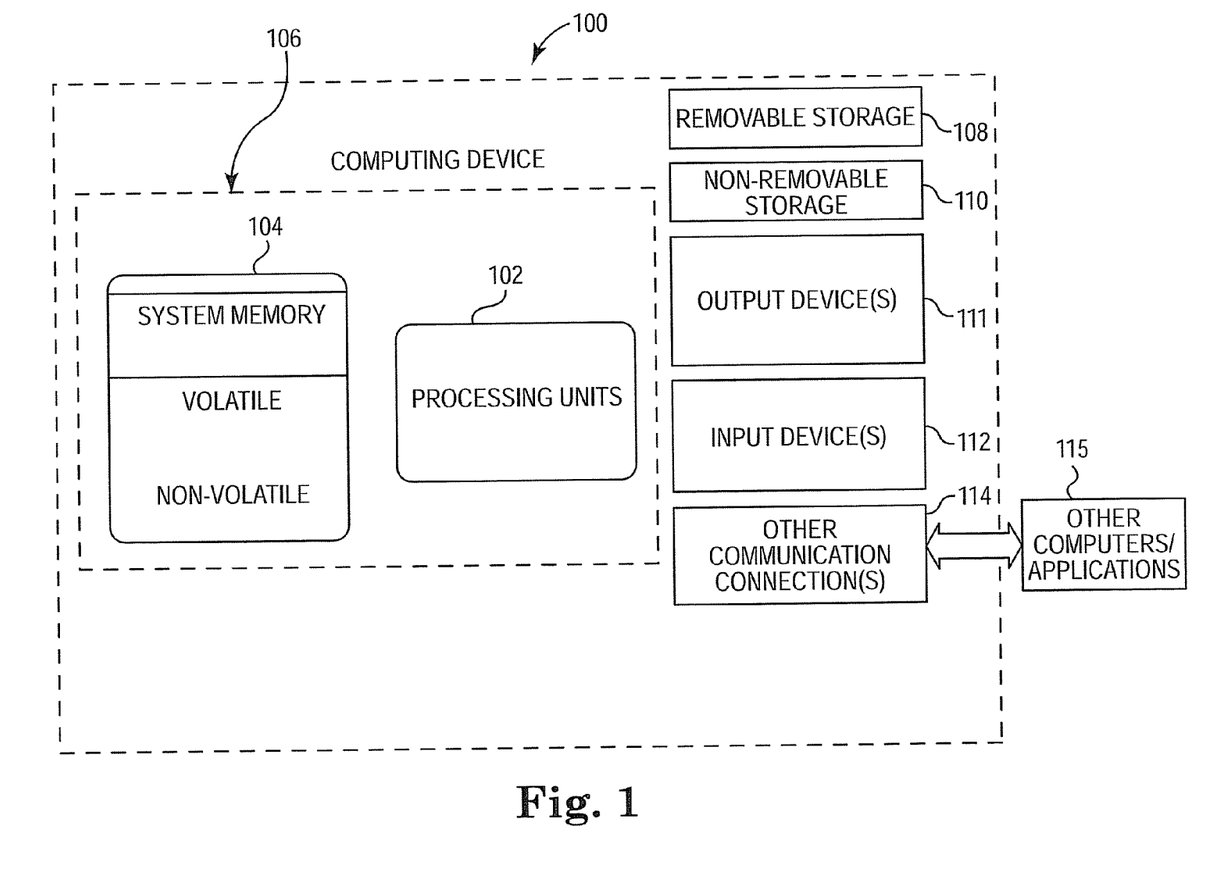
FIG. 1 is a block diagram illustrating an example of a computing device for running, hosting, or developing a hash table that can be accessed by two or more concurrent threads.

FIG. 1 illustrates an exemplary computer system that can be employed in an operating environment such as a distributed computing system or other form of computer network and used to host or run a distributed application included on one or more computer readable storage mediums storing computer executable instructions for controlling a computing device or distributed computing system to perform a method. The computer system can also be used to develop the distributed application and/or provide a serialized description or visualized rendering of the application.

The exemplary computer system includes a computing device, such as computing device 100. In a basic configuration, computing device 100 typically includes a processor system having one or more processing units, i.e., processors 102, and memory 104. Depending on the configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. Typically, the managed environment includes pre-coded solutions to common programming problems to aid software developers to create applications, such as software programs, to run in the managed environment. An example of a managed environment can include an application framework sold under the trade designation .NET Framework available from Microsoft, Inc. of Redmond, Wash. U.S.A.

The computing device 100 can be coupled to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a corresponding thread identifier, and a thread context (or thread state) until the thread is scheduled. A thread context includes the thread's set of machine registers, the kernel stack, a thread environmental block, and a user stack in the in the address space of the process corresponding with the thread.

In parallel applications, threads can be concurrently executed on the processor 102. Concurrent programming for shared-memory multiprocessors can include the ability for multiple threads to access the same data. The shared-memory model is the most commonly deployed method of multithread communication. Multiple threads execute on multiple processors, multiple processor cores, or other classes of parallelism that are attached to a memory shared between the processors.

A hash table is a commonly used data structure that is implemented in the memory 104 of the computing device 100. The hash table is designed to support various operations including inserting a value into the hash table and determining whether the hash table contains a particular value. To support these two operations efficiently, a basic hash table stores values in an array and uses a particular hash function to decide in which array element to store a particular value. For example, to store the string "abc" in a hash table, a processing device, such as processor 102, determines a hash code for string "abc", which is 5 for the sake of illustration. Accordingly, string "abc" will be placed in the hash table at array element 5. To later determine whether the hash table contains string "abc", the hash code is again computed (which results as 5) and array element 5 is checked to determine whether it contains string "abc."

Hash tables, in general, also suffer from the same issues as other shared memory systems that can be concurrently accessed and modified by two or more threads. The basic hash table is not designed for usage from multiple threads and is likely to get corrupted under such usage. In one example, locks can be acquired in order to protect the values stored in the array elements from concurrent access. Such a lock-protected hash table is a simple hash table implementation that protects its state using a single lock object, or "mutex," and the hash table becomes safe to access from concurrent threads. In a lock-protected hash table, a thread requests exclusive access to the hash table before it is allowed to modify the values stored in the hash table. Once exclusive access is granted by a lock object, the thread is free to read or modify the dictionary until it releases the lock. A single lock object, however, allows one thread at a time to access the hash table, and this approach can create a significant computational bottleneck for computing devices 100 with multiple computational cores.

One strategy to mitigate the computational bottleneck is to use a "striped-lock" hash table. Instead of using a single lock to protect the hash table, a striped-lock hash table can use a set of at least one but often two or more locks. For example, lock i protects all hash table slots such that (slot_index % lock_number)=i-1, where "%" is the modulo operation. In a modulo operation of two integers, (the dividend) modulo (the divisor) equals the remainder. If there are three locks, lock 0 will protect slots {0, 3, 6, . . . }, lock 1 will protect slots {1, 4, 7, . . . } and lock 2 will protect slots {2, 5, 8, . . . }. Hash table operations that desire access to a single slot in the table simply acquire the lock that protects the slot. As a result, operations from multiple threads can execute concurrently, provided that the threads access slots protected by different locks.

One difficulty with a striped-lock hash table is how to make the decision on the number of lock objects to be used. For optimal concurrency, a large number of locks are desirable to reduce the expected number of conflicts. Lock objects, however, take up space in memory 104, and so the locks can come to dominate memory usage, especially if the application implements many hash tables with few values stored in each. In previous implementations, the number of locks is either fixed by the managed environment or perhaps is explicitly provided by the application.

Figure 2:
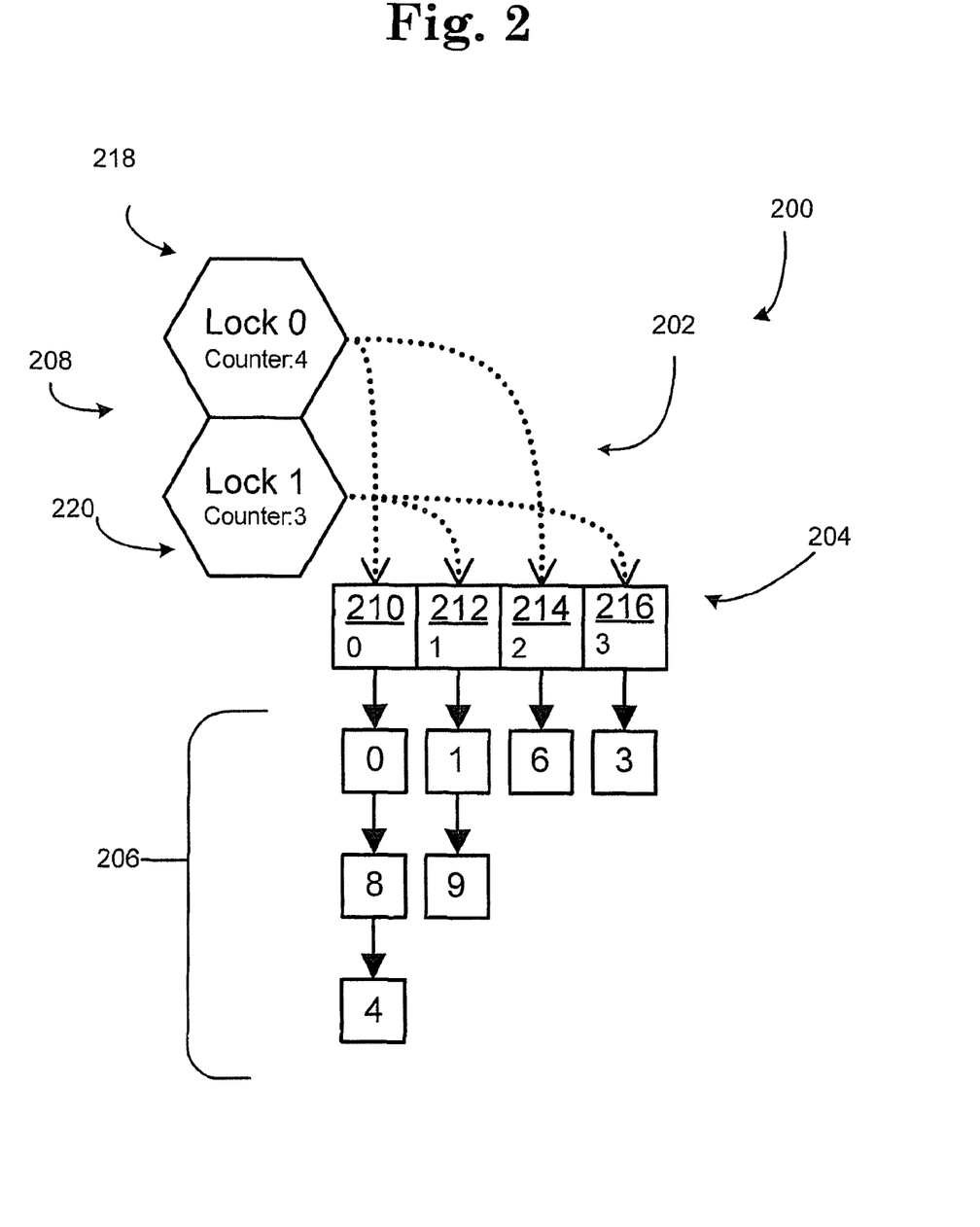
FIG. 2 is a schematic diagram illustrating an example of a striped-lock hash table implemented in a physical memory of the computing device of FIG. 1.

FIG. 2 illustrates a hash table 200, such as a striped-lock hash table, configured to dynamically tune the amount of locks based on the usage of the hash table 200. The hash table 200 configured in a first state 202 and includes a plurality of slots 204 each including one or more linked-list nodes 206 that can be used to store values. Lock objects 208 are used to protect the slots 204 (and the nodes 206). The first state 202 includes slot "0" 210, slot "1" 212, slot "2" 214, and slot "3" 216. The first state 202 also includes lock "0" 218 and lock "1" 220. In this example, lock "0" 218 protects slot "0" 210 and slot "2" 214, and lock "1" 220 protects slot "1" 212 and slot "3" 216.

Values are added into the nodes 206 of the hash table 200 with an insert value operation that computes a hash code for the value and then determines the corresponding slot 204. The illustrated examples below store integers into the hash table 200. The integer itself modulo the table size is illustrated as a hash key. In this example, values 0, 8, and 4 are stored into slot "0" 210; values 1 and 9 are stored into slot "1" 212, value 6 is stored into slot "2" 214; and value 3 is stored into slot "3" 216. In order to store other data, such as strings of text into a dictionary, a hash function can be provided to convert the data into integers with a selected formula.

Figure 3:
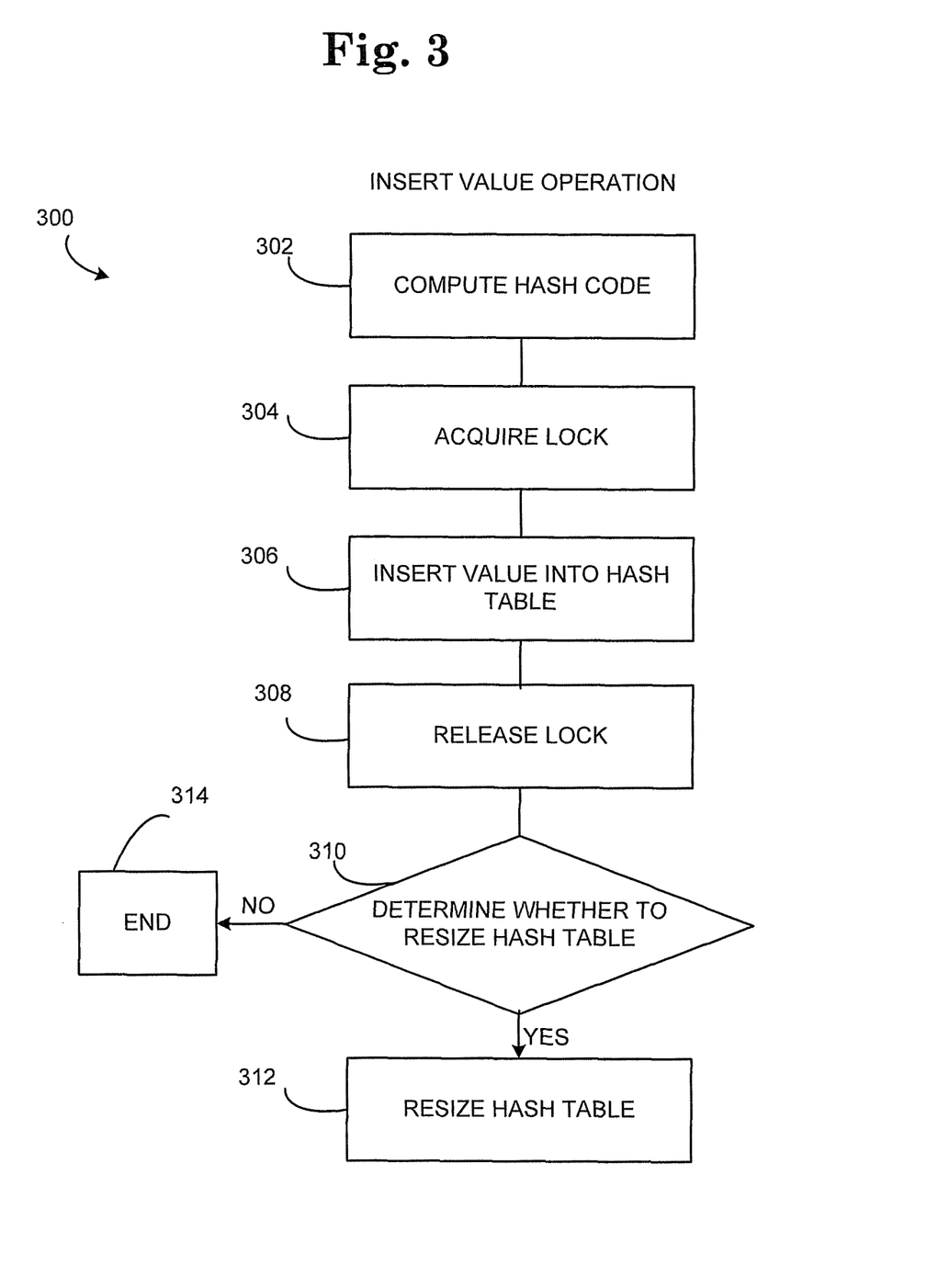
FIG. 3 is a flow diagram illustrating an example of a method that can be applied to the striped-lock hash table of FIG. 2.

FIG. 3 illustrates an example insert value operation 300 to insert a value into a node 206 of the hash table 200. The insert value operation includes applying the hash function to determine the slot where the value will be stored at 302; acquiring the lock that protects that slot at 304; adding the value at 306; and releasing the lock 308. In one example, this method is performed in order of 302 to 308. In addition, the insert value operation can determine whether the table 200 is to be resized at 310 and, if so, resize the table 200 at 312 otherwise the insert value operation 300 ends at 314.

In order to determine whether the hash table 200 includes a particular value, the hash code is determined for the sought-after value, and the table is scanned to determine if the sought-after value is included in a node 206. Scanning is performed more efficiently if there are a limited amount of nodes 206 per slot. In the illustration, the scanning is most efficient if there are two or fewer nodes 206 in a linked list per slot 204.

Various schemes can be used to decide whether to resize the table 200. One typical example is to track the total number of values inserted into the hash table 200 and resize the table when the number of items is larger than the table size, which implies that the average length of the linked-lists is now more than one. This approach uses a counter to track the number of values in the hash table. Maintaining a global counter, however, is costly because different computational threads will use relatively expensive synchronization mechanisms to update the counter.

Rather than maintain a global counter, the hash table 200 maintains a single counter for each lock object 208. Each counter tracks how many values the corresponding lock object 208 protects. The counter on each lock object 208 can be updated cheaply because the insert value operation described above already acquires the corresponding lock as part of the method. In the example illustrated in FIG. 2, lock "0" 218 corresponds with three values in slot "0" 210 and one value in slot "2" 214. The counter is set to the total amount of values protected by the lock, which in this case is four. Lock "1" 220 corresponds with two values in slot "1" 212 and one value in slot "3" 216, and thus the counter is set to three.

To decide whether to resize the hash table 200 in the first state 202, the insertion operation looks at the counter for the current lock and uses the counter to estimate the number of values in the entire hash table. For example, consider the insertion operation inserting a value 12 into the hash table 200 in the first state 202. Value 12 is to be inserted into slot "0" 210 because 12 divided by 4 leaves remainder of 0. Slot "0" 210 is protected by lock "0" 218, and the counter for lock "0" 218 is currently four. The insertion operation can estimate that the entire hash table contains roughly four values for each lock object 208, which would result in an estimate total of eight values. The actual total count is seven values. The insertion operation can apply a formula to determine whether the hash table 200 in state 202 with a table size four containing roughly eight elements is a candidate to be resized.

An example formula to resize the table during the insert value operation is:

$$K * \text{values\_per\_lock} * \text{number\_of\_locks} > \text{table\_size}$$

In this formula, "K" is a constant initially set to 1, "values_per_lock" is the number of values protected by the currently held lock object 208, "number_of_locks" is the total number of lock objects 208 protecting the hash table 200, and "table_size" is size of the table in the hash table (such as determined by number of slots 204). If the inequality above evaluates as true, the insert value operation 300 of FIG. 3 will attempt to resize the table at 310. The example formula to resize the table is sufficient for a wide range of practical workloads and hash functions.

In some cases, however, the formula above could be inaccurate and could over estimate the number of values in the table 200. An example case where the formula is inaccurate is when hash function is badly behaved. For an extreme example, if all inserted values have a hash code of "0," a single lock will protect all of the values and the remaining locks will not protect any values. In such situation, increasing the table size will waste memory because even in the larger table, all values will still end up in the single slot.

In one example, the insert value operation 300 will compute the true size of the table by adding up the counters for all locks after it has applied the formula. If the total number of values in the hash table 200 comes out significantly lower than what was expected from the formula, the insert value operation 300 will not resize the table. Instead, the constant K is set to a larger value such as twice the previous value of K. This technique provides that even if the hash function is bad and the lock counters are skewed, the table 200 will not grow out of proportion. Further, the constant K grows on each failed attempt to increase the table size so computing the total number of elements in the hash table becomes a rare occurrence.

If the table 200 is to be resized at 312, the insert value operation at 300 will acquire all of the lock objects 208, create a larger table in memory 104, copy the values into the new slots 204 and nodes 206, and release the held lock objects 208.

Figure 4:
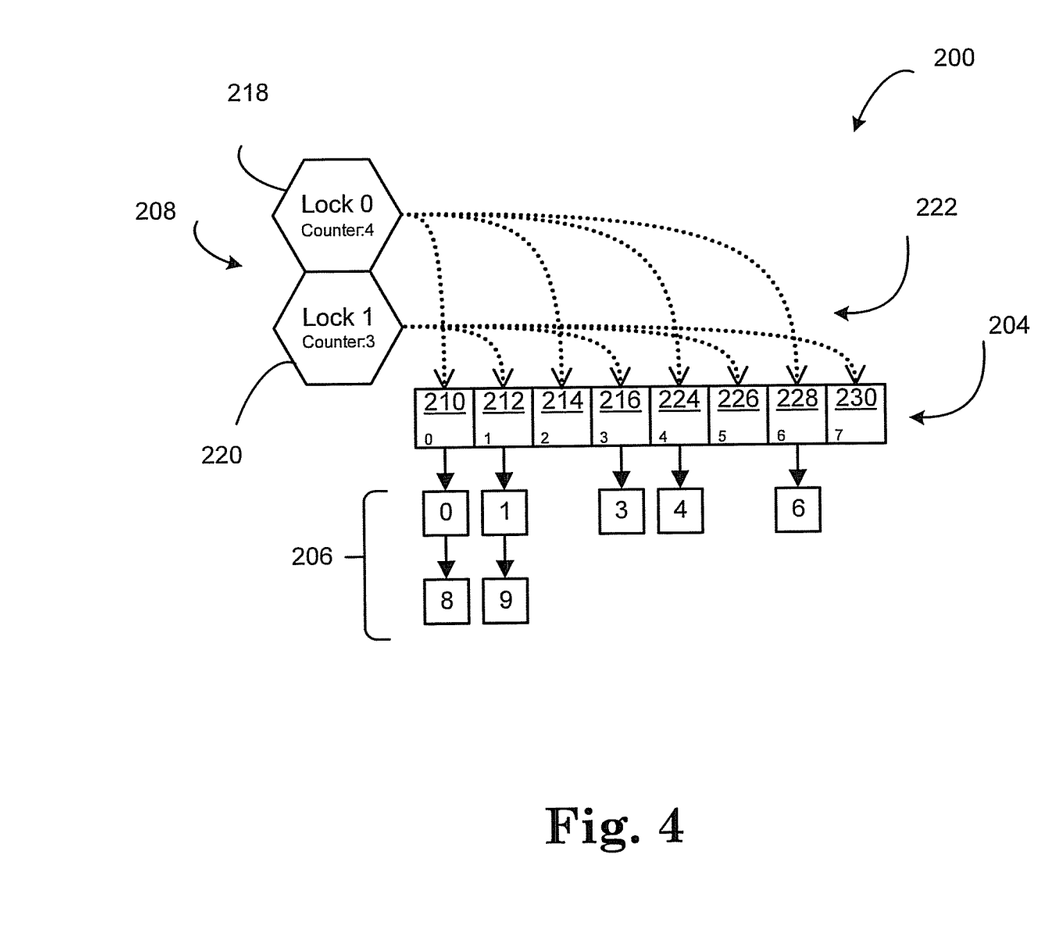
FIG. 4 is a block diagram illustrating an example of the striped-lock hash table of FIG. 2 after resizing according to a method such as the method of FIG. 3.

FIG. 4 illustrates the hash table 200 in a resized state 222. Resized state 222 in this example is double the amount of slots as state 202 illustrated in FIG. 2. The resized state 222 further includes slot "4" 224, slot "5" 226, slot "6" 228, and slot "7" 230. The values are reassigned slots 204 and nodes 206 for state 222 as state 202 described above taking into account the new size of the state 202, as shown. In the example, lock "0" 218 and lock "1" 220 remain, but now include additional slots 204 to protect. For example, lock "0" 218 also protects slot "4" 224 and slot "6" 228, and lock "1" 220 also protects slot "5" 226 and slot "7" 230.

Additional lock objects 208 can also be added to the hash table 200 during the table resizing operation at 312. The resize operation at 312 already holds all of the lock objects 208 that protect the table, no other concurrent operation can happen to the hash table 200 so it is safe to add more locks.

Figure 5:
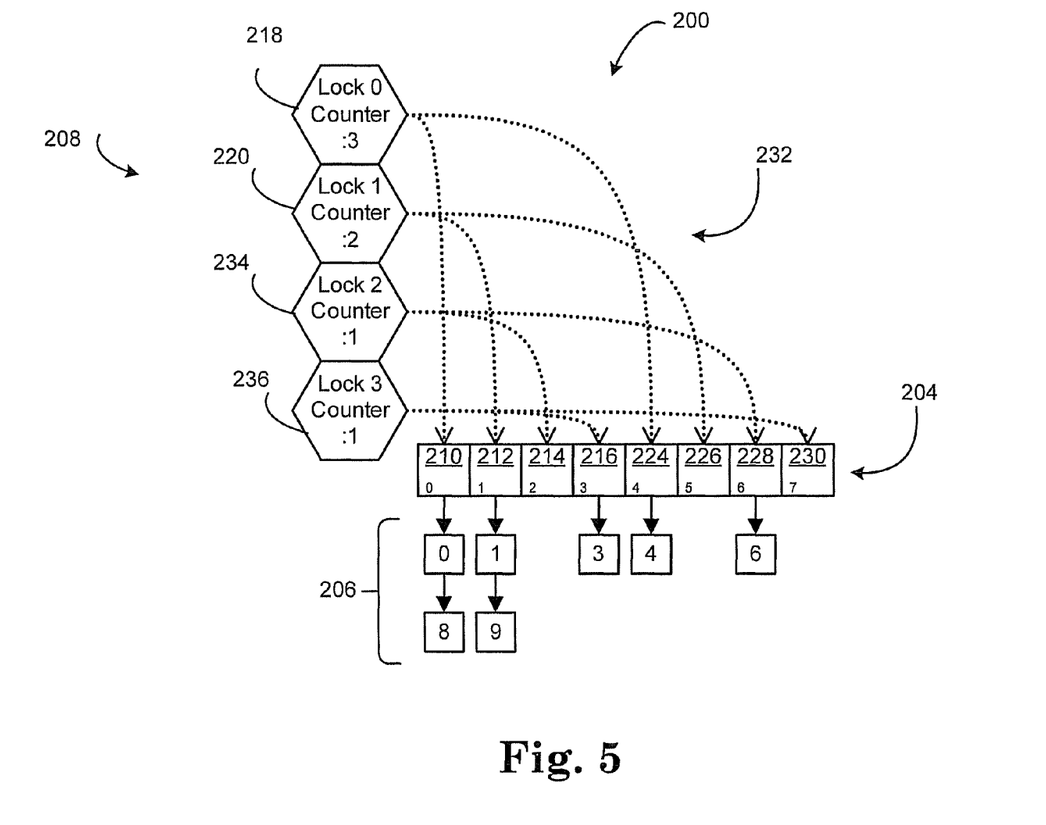
FIG. 5 is a block diagram illustrating an example of the resized stripe-lock hash table of FIG. 4 after a lock adjustment.

FIG. 5 illustrates the hash table 200 in a state 232, similar to the state 222 of FIG. 4, where new lock objects are added to accommodate the resized state 222. New locks, i.e., lock "2" 234 and lock "3" 236 are added As part of dynamically adding new locks during a table resize, the existing lock objects 208, can be reassigned. According to the discussion on determining which lock is assigned to which slot 204, lock "0" 208 continues to protects slot "0" 210 and slot "4" 224, but now new lock "2" 234 protects slot "2" 214 and slot "6" 228. Lock "1" 220 continues to protect slot "1" 212 and slot "5" 226, but now new lock "3" 236 protects slot "3" 214 and slot "7" 230.

As illustrated in the example, the number of hash table slot indexes are doubled during resize as are the number of lock objects so that concurrency can be maintained. In some examples, new locks can be dynamically and incrementally added if the hash table is resized gradually rather than all at once. Similar algorithms can be used to remove lock objects 208 and to resize the hash table 200 in cases where the hash table is made smaller.

Dynamically adding lock objects 208 as the hash table 200 grows has benefits. For example, a relatively small hash table 200, such as in state 202, will allocate relatively few lock objects 208 and so it conserves memory over typical striped-lock hash tables that over-allocate lock objects. As the hash table 200 grows, such as in 232, more locks are added to provide more concurrency and reduce computational bottlenecks associated with typical striped-lock hash tables. Thus, the algorithm gracefully adapts to the common usage patterns, without having a system pre-select the number of locks to use. Dynamic resizing and dynamic adding of lock objects can be provided with the operating system or the managed environment in order to remove these responsibilities from the application.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of resizing a concurrently accessed hash table, the method comprising:
    acquiring a lock of a plurality of locks for the hash table, wherein the lock protects an amount of values in the hash table;
    dynamically reconfiguring a size of the hash table in a first state to a size of the hash table in a second state;
    counting a total amount of values for each of the plurality of locks and comparing the total amount of values against the amount of values protected by the acquired lock multiplied by an amount of the plurality locks to determine whether to dynamically reconfigure the size of the hash table in the first state; and
    dynamically adjusting an amount of the plurality of locks based on comparing the size of the hash table in the first state to the size of the hash table in the second state.

2. The method of claim 1 wherein dynamically reconfiguring the size includes enlarging the hash table.

3. The method of claim 2 wherein dynamically adjusting the amount of the plurality of locks includes adding locks to the hash table.

4. The method of claim 1 wherein dynamically reconfiguring the size of the hash table includes doubling the size of the hash table and wherein dynamically adjusting the amount of the plurality of locks includes doubling the amount of the plurality of locks.

5. The method of claim 4 wherein the each of plurality of locks protects an amount of slot indexes in the first state and wherein each of the plurality of locks of the dynamically adjusted amount of the plurality of locks protects the amount of slot indexes in the second state.

6. The method of claim 1 wherein a determination as to whether to resize the hash table is made as part of adding a value to the hash table.

7. A method of resizing a concurrently accessed hash table, the method comprising:
    acquiring a lock of a plurality of locks for the hash table, wherein the lock protects an amount of values in the hash table;
    dynamically reconfiguring a size of the hash table based upon comparing the amount of values protected by the acquired lock multiplied by an amount of the plurality locks against an initial size to obtain a new size of the hash table; and
    dynamically adjusting the amount of the plurality of locks based on comparing the new size of the hash table against the initial size of the hash table.

8. The method of claim 7 wherein dynamically reconfiguring the size of the hash table includes acquiring the plurality of locks.

9. The method of claim 8 wherein a value is added to the hash table between the acquiring the lock of the plurality of the locks and the acquiring the plurality of locks.

10. The method of claim 9 wherein the value is protected by the acquired lock.

11. The method of claim 8 and further comprising releasing the plurality of locks after dynamically adjusting the amount of the plurality of locks.

12. The method of claim 7 and further comprising counting a total amount of values for each of the plurality of locks and comparing the total amount of values against the amount of values protected by the acquired lock multiplied by an amount of the plurality locks to determine whether to dynamically resize the hash table.

13. The method of claim 7 wherein dynamically reconfiguring the size of the hash table includes creating a new table from the hash table, and copying values from the hash table into the new hash table.

14. The method of claim 7 wherein the hash table includes a plurality of slots, wherein an amount of the plurality of slots is related to the size of the hash table, and each slot includes a node, wherein each node can store a value.

15. The method of claim 14 wherein the plurality of locks protect the plurality of slots.

16. The method of claim 7 wherein the hash table is enlarged during the dynamically reconfiguring the size of the hash table, and the amount of locks is increased during the dynamically adjusting the amount of the plurality of locks.

17. A computer readable storage medium storing computer executable instructions for controlling a computing device configured to perform a method of resizing a hash table, the method comprising:
   generating a hash table as a plurality of slot indexes wherein each slot index includes a node, wherein each of the nodes is configured to contain a value, wherein the hash table is accessible by a plurality of concurrent threads of an application;
   acquiring a lock of a plurality of locks for the hash table, wherein the lock protects an amount of values in the hash table from concurrent access of the values;
   acquiring a remainder of the plurality of locks for the hash table to protect the hash table from access;
   dynamically adding slot indexes to the hash table based upon comparing the amount of values protected by the acquired lock multiplied by an amount of the plurality locks against an initial size to obtain a new size of the hash table;
   reassigning some of the values to correspond with additional slot indexes;
   dynamically adjusting the amount of the plurality of locks based on comparing the new size of the hash table against the initial size of the hash table; and
   reassigning the plurality of locks to accommodate the additional slot indexes.

18. The computer readable medium of claim 17 wherein generating the hash table includes creating a data structure in memory wherein the nodes of the slot index include linked-lists corresponding with each slot index.

19. The computer readable medium of claim 17 wherein the method is performed when a value is added to the hash table.

20. The computer readable medium of claim 19 wherein the acquired lock corresponds with a hash function performed on the value to be added to the hash table.

* * * * *